United States Patent [19]

Endicott, Jr. et al.

[11] 4,160,169
[45] Jul. 3, 1979

[54] PARALLEL SCANNING SYSTEM

[75] Inventors: Donald L. Endicott, Jr., San Diego, Calif.; Daniel J. Solarek, Jr., Swanton, Ohio

[73] Assignee: The United States of America as represented by the Secretary of the Navy, Washington, D.C.

[21] Appl. No.: 876,974

[22] Filed: Feb. 13, 1978

[51] Int. Cl.² .............................................. G06K 7/10
[52] U.S. Cl. .................................. 250/570; 353/26 R
[58] Field of Search ............... 250/566, 568, 570, 571, 250/211 J, 578; 235/456, 460; 353/26 R, 26 A, 27 R, 27 A

[56] References Cited

U.S. PATENT DOCUMENTS 3,911,410 10/1975 Ohta et al. ........................ 353/27 R 4,110,020 8/1978 Johnson et al. ..................... 250/570

*Primary Examiner*—David C. Nelms
*Attorney, Agent, or Firm*—Richard S. Sciascia; Ervin F. Johnston; James O. Skarsten

[57] ABSTRACT

Apparatus for scanning microimages containing graphic information which includes a film provided with a matrix of microimage spaces, at least some of the spaces being occupied by microimages, and a light source for illuminating the microimages to generate light images of the graphic information contained on the microimages. The apparatus further includes light sensing devices for generating analog signals which represent the graphic information contained upon the microimages and missing image sensors for generating a signal which signifies that a given microimage space of the matrix is not occupied by a microimage.

10 Claims, 3 Drawing Figures

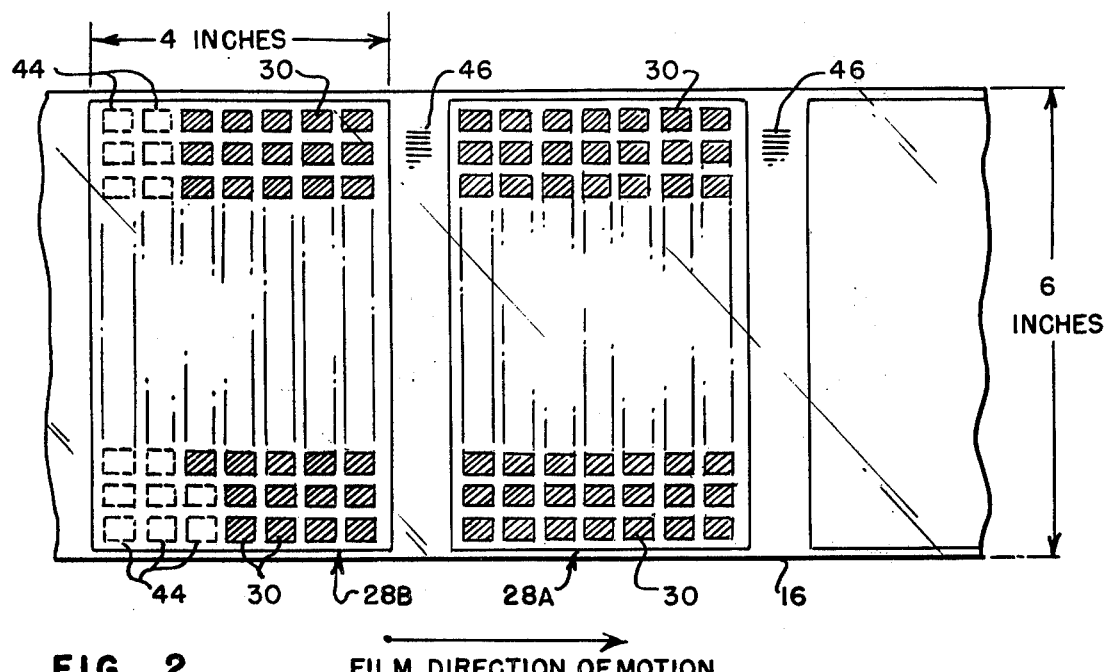
FIG. 2.  FILM DIRECTION OF MOTION
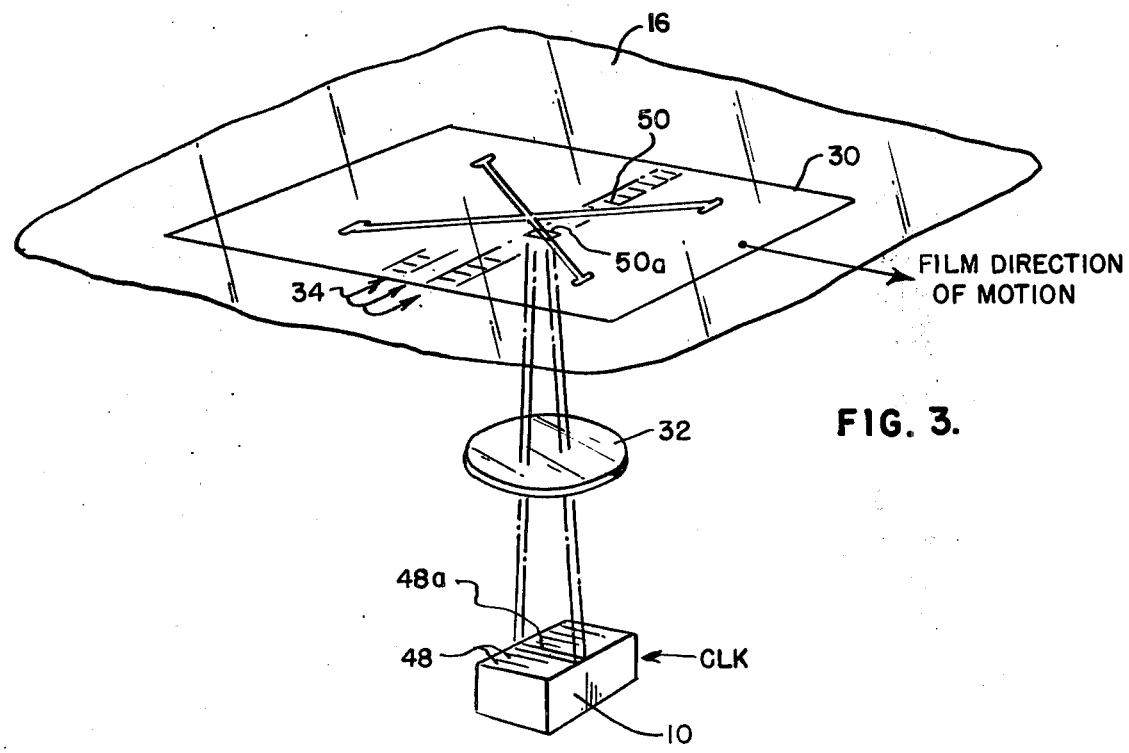
FIG. 3.

PARALLEL SCANNING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains to apparatus for scanning graphic information contained upon light transmissive plates, such as microimages, to provide electrical signals which represent or encode the information. More particularly, the invention pertains to apparatus for parallel scanning, or for simultaneously scanning all of the microimages included in a row of a matrix of microimage spaces. Even more particularly, the invention pertains to scanning apparatus of the above type which is provided with means for sensing that a given space of the matrix is not occupied by a microimage.

It is presently well known to store the graphic information contained upon a page of a document by copying the information upon a microimage, or light transmissive plate which is greatly reduced in size from the page. It is also well known to position the microimages of a given document or related documents upon a single sheet of film, or microfiche, which has a standard size and a standard array of spaces for each microimage. A common microfiche format is that of the National Micrographic Association (NMA), which prescribes microfiche of six inches by four inches, each sheet provided with a 14×7 matrix array of spaces for microimages, and some or all the spaces being occupied by microimages.

To transmit information contained upon microfiche to a remote location in a manner which avoids physical transfer of the microfiche, various systems have been developed for successively scanning sheets of microfiche containing the required information. The output of such a system is a series of electrical signals in which the information is encoded and which is readily communicable to the remote location. However, such scanning systems as are presently available generally are unable to simultaneously scan more than one microimage at a given time or to simultaneously scan all points across the entire width of the microimage. Rather, most presently available systems must sweep a light source across the width of a microimage, sensing light intensity at different points or pixels (picture elements) at different times during the sweep with a light sensitive device.

In addition, a microfiche of the above type, having a given number of microfiche spaces, may contain fewer microimages than the number of spaces. If a scanning apparatus was not provided with a means for sensing unoccupied or blank spaces, all parts of a blank space would be scanned and converted to electrical signals. Because such signals would represent no graphic information, their transmission to a remote location is unnecessary. Their elimination would result in lower cost for a transmission link to the location.

SUMMARY OF THE INVENTION

The present invention provides apparatus for scanning graphic information contained upon light transmissive plates, and includes immovable light sensing means for responding to received light images by generating a plurality of analog signals which represent the graphic information upon each of the light transmissive plates. The invention further includes an immovable light source for projecting light toward the sensing means and a transport means for passing the light transmissive plates between the light source and the light sensing means. Preferably, the transport means comprises film upon which the light transmissive plates are selectively arrayed, and roller means for providing motion to the film. It is anticipated that an embodiment of the invention may be usefully employed to scan light transmissive plates containing any sort of graphic information, such as lines of printed characters, photographic images or pictorial images.

In a preferred embodiment of the invention, a film may be employed which comprises a plurality of microfiche which are successively joined along the length of the film, each microfiche having a matrix array of microimage spaces, some or all of the spaces being occupied by microimages. The light sensing means comprises a number of charge coupled devices (CCD's) which is equal to the number of microimage spaces in a matrix row. The CCD's are selectively spaced apart in a linear array so that each of the microimages in a given matrix row simultaneously passes between the light source and a different CCD. Each CCD simultaneously scans each of the pixels in a line across the width of a microimage and couples the graphic information contained therein to a scanning processor, in the form of a set of analog signals. The scanning processor provides a digital output in which the graphic information contained upon respective light transmissive plates is encoded and suitably addressed.

To achieve data compression in the digital output of the scanning processor, in applications where the invention is to be used to scan microfiche or other arrays of light transmissive plates in which some of the spaces for light transmissive plates may not be occupied, the invention is further provided with missing image sensor means. The missing image sensor is coupled to the scanning processor, and is positioned to sense the absence of a light transmissive plate in the space provided therefor before the space is scanned by a CCD. Whenever the sensor detects an unoccupied space in a matrix array, a signal characteristic thereof is coupled to the scanning processor. In response, the scanning processor inserts a code into its output which identifies the unoccupied space, and which is a much shorter digital transmission than the transmission required to encode each pixel of every line of the microimage.

OBJECTS OF THE INVENTION

An object of the present invention is to reduce the mechanical complexity of a system for scanning graphic information contained upon light transmissive plates.

Another object is to provide an improved system for scanning graphic information contained upon light transmissive plates which are positioned in successive matrix arrays, such as microimages contained upon microfiche.

Another object is to provide an apparatus for increasing the rate at which graphic information contained upon microimages or other light transmissive plates may may be scanned.

Another object is to provide improved apparatus for simultaneously scanning graphic information contained upon each of a plurality of light transmissive plates.

Another object is to provide an apparatus for simultaneously scanning each of the pixels of a scan line of a light transmissive plate containing graphic information.

Another object is to eliminate acceleration and deceleration of moving parts in an apparatus for scanning graphic information contained upon a succession of light transmissive plates.

Another object is to provide an apparatus for scanning a continuous input of microimages, such as microimages contained upon microfiche.

Another object is to provide an apparatus for scanning microimages contained upon a plurality of microfiche sheets, which prevents loss or mixing of individual sheets.

Another object of the invention is to provide apparatus for scanning microfiche containing an array of microimage spaces, some of the spaces being occupied by microimages and other spaces not so occupied, wherein the apparatus provides means for indicating unoccupied spaces.

These and other objects of the invention will become more readily apparent from the ensuing specification when taken together with the drawings.

BRIEF DESCRIPTION OF THE DRAWINGS

FIG. 2 shows a portion of film which may be used for the embodiment of FIG. 1.

FIG. 3 shows a portion of the embodiment of FIG. 1 in greater detail.

DESCRIPTION OF THE PREFERRED EMBODIMENT

Figure 1:
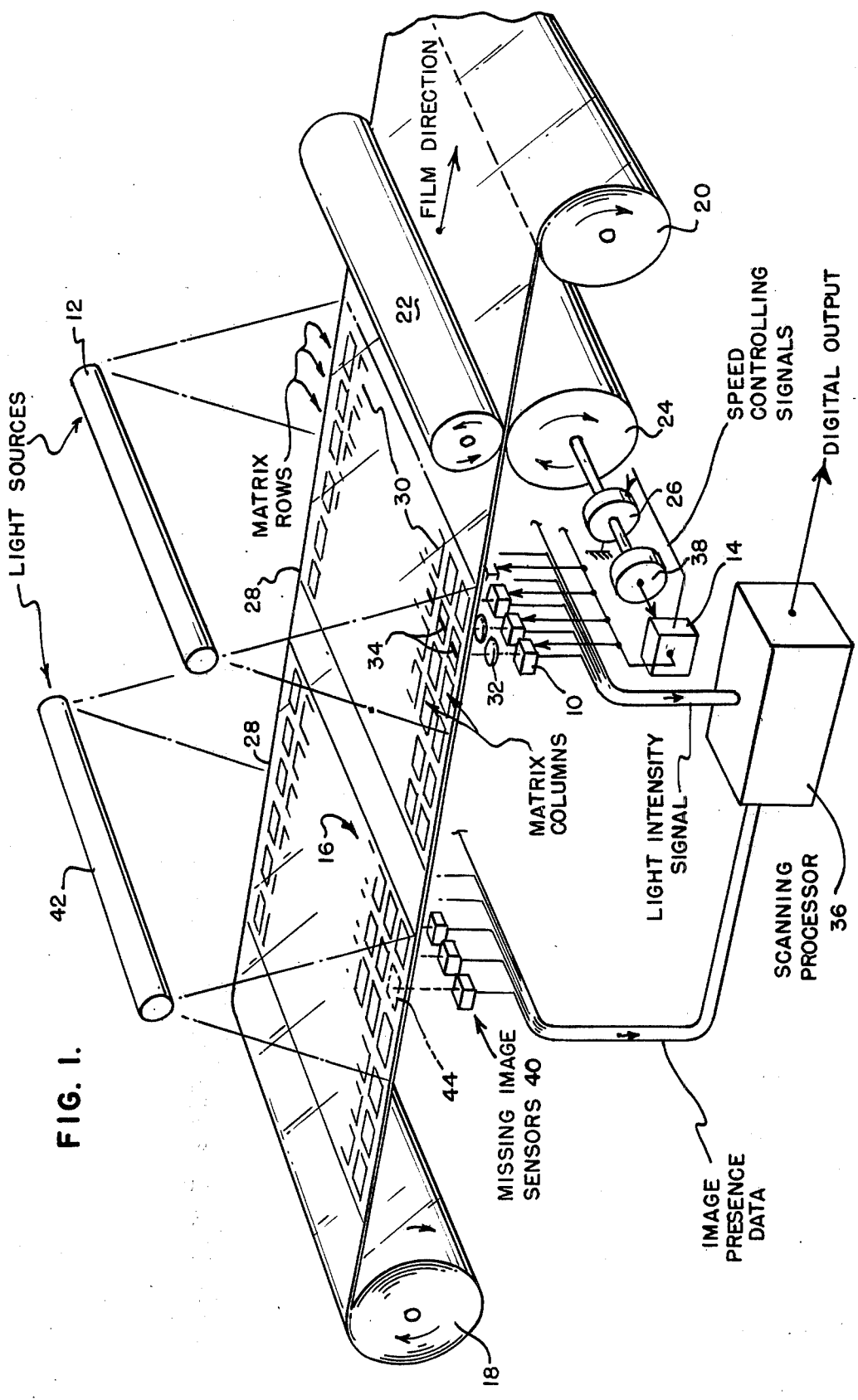
FIG. 1 is a perspective view showing an embodiment of the invention.

Referring to FIG. 1, there are shown CCD's 10 immovably positioned in a linear array, each CCD 10 comprising a linear array of resolution or light responsive elements, and there is also shown a light source 12 immovably positioned to project light of constant intensity toward each of the elements of CCD's 10. Light source 12 comprises an incandescent source of selected intensity, and each CCD 10 comprises a 1728 element Fairchild CCD. As is well known in the art, when a CCD receives a light image, each light responsive element stores an amount of charge which is proportional to the intensity of the portion of the image impinging thereupon. The CCD is then clocked, and signals proportional to the respective stored charges are serially shifted out of the CCD. If the intensity of the impinging light is an analog quantity, the shifted signals are also analog, that is, they may have any value within a range of values. Scanning controller 14, which controls the operation of each CCD 10 and includes a clock, typically 10 MH$_z$, is coupled to each CCD 10 to provide the required clock pulses therefor.

A film 16 is joined to both a supply roller 18 and a take-up roller 20, and is positioned between pinch drive rollers 22 and 24, which are rotated by a mechanical drive 26 to move film 16. It is clear that the intensity of light impinging upon a CCD 10 varies with the transmittance of the particular portion of film passing between the CCD and light source 12.

Film 16 is formed of material of sufficient flexibility to be wrapped around rollers 18 and 20, and includes a number of light transmissive plates, which contain graphic information and are arrayed in a matrix, or a plurality of matrices of rows and columns. For example, film 16 may contain or be comprised of a plurality of standard National Micrographic Association microfiche 28, which are positioned one after another along the length of film 16, and each of which includes a 14×7 matrix of microimage spaces or positions, some or all of the spaces being occupied by microimages 30. Microimages 30 may comprise, for example, light transmissive microimages of pages containing printed or written information. All portions of film 16 not included within the boundaries of a microimage are of selected uniform transmittance.

Rollers 18, 20, and 22 and 24 are respectively oriented to move film 16 in a direction orthogonal to a plane which includes light source 12 and CCD's 10. Each matrix of microimage spaces is oriented upon film 16 so that the columns thereof are parallel to the direction of motion of film 16, and so that the rows thereof are parallel to the linear array of CCD's 10. The number of CCD's 10 in the linear array is equal to the number of spaces in each matrix row, and one CCD 10 corresponds to each matrix column. That is, CCD's 10 are selectively spaced apart so that microimages 30 in different columns of a matrix pass betwween light source 12 and different CCD's 10.

Given the structure shown in FIG. 1, all of the microimages 30 in a given matrix row simultaneously pass between light source 12 and a different CCD 10, so that all of the microimages in the row are simultaneously scanned. The time period required for a microimage 30 to pass between a CCD 10 and light source 12 comprises a number of scan intervals, and during each scan interval a CCD receives an image of the graphic information contained within, or scans, one of a plurality of scan lines. Each scan line comprises a very narrow segment of a microimage 30, one dimension of a scan line being parallel to and equal to a horizontal edge of a microimage, and the second dimension of the scan line being parallel to a vertical edge of the microimage, and being very small in comparison to the first dimension.

Referring further to FIG. 1, there is shown a focusing lens 32 immovably positioned between film 16 and each of the CCD's 10, each lens 32 provided to focus a scan line 34 of a microimage upon the light responsive elements of a CCD 10 at the beginning of each scan interval. The intensity of the portion of the focused light which impinges upon a given element is directly related to the transmittance of, and therefore to the graphic information included within, a very small partition of scan line 34, or pixel, which corresponds to the element. Consequently, the element stores an amount of charge which defines or represents the graphic information included within the pixel. The charges respectively stored by each of the 1728 elements of the CCD 10 is response to the focused scan line together define or represent all of the graphic information included within scan line 34.

After each element of a scanning CCD has stored its respective charge, but before the conclusion of the scan interval, a clock signal coupled to the CCD from scanning controller 14 serially shifts 1728 analog signals into scanning processor 36, each analog signal being functionally related to one of the stored charges, and the analog signals together representing the graphic information included within scan line 34. During the same scan interval, 1728 analog signals from each of the other CCDs of the linear array are also shifted into scanning processor 36, the conclusion of the scan interval coinciding with the beginning of the next following scan interval.

Scanning processor 36 comprises a device which receives the analog signals from each CCD 10, and responds thereto by providing a digital output in which all the information contained in received analog signals is represented or encoded. In a simple embodiment, scanning processor 36 may comprise conventional analog to digital conversion circuitry. In a more complicated embodiment, scanning processor 36 may include circuitry for generating a digital output in which the information contained in the analog signals is encoded and suitably addressed, scanning processor 36 making use of standard coding or data compression techniques to minimize the amount of digital output required to communicate a given amount of scanned graphic information.

It will be readily apparent that the time width of a scan interval, during which a CCD 10 receives a scan line image and shifts out 1728 analog signals, depends on the frequency of the clock 14 contained in scanning controller 14. It will be further apparent that each successive scan line must be focused upon a CCD precisely at the beginning of a scan interval. Otherwise, the analog signals generated by a scanning CCD will either represent only part of the graphic informaton contained in a scan line, or else will represent interference between the graphic information in adjacent scan lines. To achieve the required precision, rollers 22 and 24 are rotated in such manner that film 16 moves at a constant speed, which may be determined by dividing the aforementioned second dimension of a scan line by the time width of a scan interval. To assure that film speed is retained at the selected constant value within very close limits, speed monitor 38 is coupled to scanning controller 14 such that the measured film speed is compared to the reference clocked speed. The constantly adjusted speed controlling signals are input to drive mechanism 26 to control speed of rotation of rollers 22 and 24, and thereby to control film speed. Monitor 38 may comprise a device conventionally known as an optical shaft encoder, which is mechanically coupled to the drive mechanism 26, and through the scanning controller 14 is coupled electrically to drive mechanism 26 in a conventionally known manner so that the speed of rotation of roller 24 is phase lock looped to the scanning rate, that is, to the number of scan intervals per unit time.

Referring once more to FIG. 1, there are shown missing image sensors 40 comprising a linear array of CCD's, photodiodes, or similar photoelectric sensors, one sensor 40 corresponding to each matrix column, and there is further shown a light source 42 positioned to project light toward missing image sensors 40. The sensor 40 corresponding to a matrix column is positioned with respect to the CCD 10 corresponding to the same column so that each microimage space in the column passes between the CCD 10 and light source 12 a selected time after passing between the missing image sensor 40 and light source 42.

As unoccupied microimage space 44 passes between light source 42 and a sensor 40, a number of sets of analog signals are successively generated thereby, all of the signals having an equal value determined by the aforementioned uniform transmittance of film 16. All of the signals generated by the sensor 40 are coupled to missing image circuitry in scanning processor 36, and together comprise a signal pattern which signifies that a microimage is missing from the space. Missing image circuitry comprises any conventional circuitry which is capable of recognizing the above pattern signifying an unoccupied microimage space, and which is further capable of subsequently responding to the pattern, when the unoccupied space is passing between light source 12 and a CCD 10. The missing image circuitry causes all of the analog signals from a CCD 10 scanning the unoccupied space to be ignored, and further causes a brief digital code, representing the unoccupied space, to be inserted into the digital output of scanning processor 36.

Referring to FIG. 2, there are shown microfiche 28A and 28B each comprising a 14×7 matrix of microimage spaces. FIG. 2 shows each of the microimage spaces of microfiche 28A to be occupied by a microimage 30, and further shows some of the microimage spaces of microfiche 28B to be occupied by microimages, and other of the spaces thereof to be unoccupied.

Referring further to FIG. 2, there is shown a bar code 46 preceding each microfiche on film 16 to specifically identify the microfiche. Each bar code is scanned by CCD's 10, and information represented thereby is included in the digital output of scanning processor 36.

Referring to FIG. 3, there are shown light responsive elements 48 comprising a CCD 10, each element receiving the image of a corresponding pixel 50, or partition of a scan line 34, as hereinbefore described. For example, FIG. 3 shows element 48a, corresponding to pixel 50a, receiving a small part of an image of a character "X" contained by microimage 30.

If a microimage 30 comprises a microimage of a page of printed characters, the microimage 30 is very usefully oriented on film 16 so that lines of characters are parallel to CCD 10. By so orienting the microimages, scanning processor 36 will readily detect a scan line which includes only a space between character lines, since each of the signals from the CCD will be equal and at their maximum value. To enhance data compression, scanning processor 36 may be further provided with circuitry which is sensitive to a pattern of signals characteristic of a space between characters, which responds thereto by inserting a brief code into the digital output of scanning processor 36, which represents the scanned blank space in abbreviated form.

While the aforementioned embodiment of the invention employs a system of film and rollers to continuously move a plurality of microfiche between light source 12 and CCDs 10, it is anticipated that other embodiments of the invention may employ other means for continuously passing sheets of microfiche therebetween, including sheets of microfiche which are separated from one another.

While the aforementioned embodiment discloses a system for sensing light images generated by passing light through plates containing graphic information, it is anticipated that in other embodiments of the invention, light images may be sensed which are generated by reflecting light from plates containing graphic information.

Obviously, many other modifications and variations of the present invention are possible in the light of the above teachings, and, it is therefore understood that within the scope of the disclosed inventive concept, the invention may be practiced otherwise than specifically described.

What is claimed is:

1. Apparatus for scanning graphic information contained upon plates arrayed in a matrix of rows and columns, all of the graphic information contained upon each of said plates being included in one of a plurality of scan lines and all of the graphic information included in each of said scan lines being further included in one of a plurality of picture elements, said apparatus comprising:
- a light source for projecting light toward said plates;
- a light sensing device corresponding to each column of said matrix, a given light sensing device for successively receiving images of the graphic information included within each of the scan lines of each of the plates in the column to which the given light sensing device corresponds,
- each of said light sensing devices comprising a linear array of light responsive elements,
- each of said light responsive elements for receiving light of intensity determined by the graphic information included within one of said picture elements and for generating an analog signal which is functionally related to the intensity of said received light, and;
- transport means for providing relative motion between said plates and said light sensing devices.

2. The apparatus of claim 1 wherein said plates are light transmissive, the light transmitted through respective portions of each plate being determined by the graphic information contained upon the plate, and wherein:
- said transport means includes means for simultaneously passing each plate in a given row of said matrix between said light source and a different one of said light sensing devices.

3. The apparatus of claim 2 wherein:
- each of said light sensing devices receives an image of the graphic information included within a scan line of one of said plates at the beginning of each of a succession of scan intervals, and;
- said apparatus includes control means for coupling a clock signal to each of said light sensing devices during each of said scan intervals, the light responsive elements of each light sensing device responding to clock signals received by their respective light sensing devices by generating sets of analog signals, each of said sets of analog signals representing the graphic information included within one of said scan lines.

4. The apparatus of claim 3 wherein said transport means includes:
- film upon which said plates are arrayed in said matrix and;
- roller means for moving said film in a direction orthogonal to a plane which includes said light sensing devices and said light source.

5. The apparatus of claim 4 wherein:
- said transport means further includes means coupled between said roller means and said control means for moving said film at a constant speed which is equal to a dimension of one of said scan lines divided by the time duration of one of said scan intervals.

6. The apparatus of claim 5 wherein said apparatus further comprises:
- scanning processor means coupled to said light sensing devices for providing a digital output in which the graphic information represented by each of said sets of analog signals is encoded.

7. Apparatus for scanning microimages containing graphic information which comprises:
- a film means provided with a matrix of microimage spaces, at least some of said spaces being occupied by said microimages;
- a first light source for illuminating said microimages to generate light images of the graphic information contained on said microimages;
- light sensing means receiving said light images for generating analog signals which represent the graphic information contained upon said microimages;
- missing image sensor means for generating a signal which signifies that a given microimage space of said matrix is not occupied by a microimage.

8. The apparatus of claim 7 wherein:
- said light sensing means comprises an array of scanning charge coupled devices, each of the microimage spaces in a given row of said matrix passing between said first light source and a different one of said scanning charge coupled devices, and;
- said missing image sensor means comprises a second light source and an array of photoelectrical devices, each of the microimage spaces in a given row of said matrix passing between said second light source and a different one of said photoelectrical devices, and a given microimage space passing between said first light source and one of said scanning charge coupled devices at a selected time after passing between said second light source and one of said photoelectrical devices.

9. The apparatus of claim 7 wherein said apparatus further comprises:
- a scanning processor means receiving said analog signals from said light sensing means for generating a digital output in which the graphic information contained said microimages is encoded, and for receiving said missing image signals from said missing image sensor means for generating a digital code signifying that a given microimage space of said matrix is not occupied by a microimage.

10. The apparatus of claim 7 wherein:
- said apparatus includes roller means joined to said film means for passing successive matrices of microimage spaces between said first light source and said light sensing means at a constant speed.

* * * * *